United States Patent [19]
Baals et al.

[11] Patent Number: 5,412,713
[45] Date of Patent: May 2, 1995

[54] DISPLAY FOR A TELEPHONE TERMINAL

[75] Inventors: Kimberly A. Baals, Matawan; Edward W. Boakes, Middletown; Kathleen J. Chylinski, Bridgewater; Darren A. Kall, Highland Park; Gary C. Smith, Freehold, all of N.J.

[73] Assignee: AT&T Corp., Murray Hill, N.J.

[21] Appl. No.: 47,589

[22] Filed: Apr. 13, 1993

[51] Int. Cl.⁶ .................................. H04M 11/00
[52] U.S. Cl. .................................... 379/96
[58] Field of Search .......... 379/96, 97, 98, 93, 379/94, 354, 355, 216; 348/14, 15, 16, 17, 18, 19; 395/155, 156, 157

[56] References Cited

U.S. PATENT DOCUMENTS

| | | | |
|---|---|---|---|
| 4,850,009 | 7/1989 | Zook et al. | 379/110 |
| 4,885,580 | 12/1989 | Nato et al. | 379/354 |
| 4,899,377 | 2/1990 | Bauer et al. | 379/354 |
| 4,922,516 | 5/1990 | Butter et al. | 379/96 |
| 5,065,309 | 11/1991 | Putham et al. | 379/96 |
| 5,119,414 | 6/1992 | Izumi | 379/216 |
| 5,136,637 | 8/1992 | Rust et al. | 379/216 |

OTHER PUBLICATIONS

*Mastering Windows 3.1*. Robert Cowart. 1992. pp. 403–407.

Primary Examiner—Curtis Kuntz
Assistant Examiner—Stella L. Woo
Attorney, Agent, or Firm—Samuel R. Williamson

[57] ABSTRACT

In an interactive display for a telephone terminal, movement between menu screens is controlled by hard buttons located on the telephone terminal. Directional arrow symbols, responsive to the switching action provided by pressing the hard buttons, are selectively employed in the display space of the menu screens for providing a visual indication to a user of available previous and/or next menu screens. These arrow symbols occupy minimal space in the display screens, yet enable the user of the telephone terminal to easily determine the availability of and direction to proceed to access additional available menu selections in the interactive display.

14 Claims, 3 Drawing Sheets

DISPLAY FOR A TELEPHONE TERMINAL

BACKGROUND OF THE INVENTION

1. Technical Field

This invention is directed to telephone terminals and more particularly, to a telephone terminal configurable by a user for accessing features available on a telephone terminal through an interactive display arrangement.

2. Description of the Prior Art

Current trends in the design of telephone terminals indicate that more and more of telephone functionality is being integrated into the telephone display. For example, information as to the features available on the display has migrated from LEDs to the display, and local additions such as directories, status inspection, incoming caller information etc., are all migrating to the display.

The technology presently in use in telephone displays is character-based liquid crystal device (LCD) displays. These displays are configured in various array sizes such as, for example, 2 line by 24 character LCD and 2 line by 40 character LCD. In order to be artfully incorporated into the telephone housing, these displays tend to be small, typically on the order of one inch in height. Also, in order to provide a reasonable number of characters for information such as caller information and directory access information, a small font size for the characters is generally used.

Many display arrangements available today permit accessing the features available on the display through softkeys. When interrogating a list of menu selections on a telephone terminal having such a display, for example, it is advantageous to be able to both advance and back up to menu screens in the directory. The screen prompts for commands which facilitate this movement, typically "Previous" and "Next", occupy space in the display and thereby limit the space available in the display for other softkey functions.

The use of both Previous and Next screen prompts are known and have previously been incorporated into display devices employing softkey functions. For example, U.S. Pat. No. 4,725,694, which issued to C. Auer et al. on Feb. 16, 1998, describes a computer interface device which provides these two prompts in softkeys. Although employing these prompts in a menu screen is reasonable wherein the screen has several available lines for textual prompts, such use diminishes the available display space on a small screen, having, for example, only two or three lines available for textual prompts.

One known display device having limited display space on a screen employs just one softkey prompt for moving among menu screen displays in the directory, thereby conserving space in the screen. This softkey function, typically labeled "MORE", provides the "next" softkey prompt for advancing to the next screen having the next set of menu selections. With this display arrangement, however, a user is unable to back up to a previously viewed screen. Rather the user must cycle completely through each menu screen while at a particular level before being able to arrive back at the screen he or she might then desire to access. It is desirable, therefore, that a user of a small display terminal be able to move easily among menu screens in an interactive display arrangement without diminishing the available display space on a small screen.

SUMMARY OF THE INVENTION

The prior art problem is solved in accordance with the present invention by providing a user of a telephone terminal with an interactive display, wherein movement between menu screens in the interactive display is controlled by hard buttons located on the telephone housing.

In preferred embodiments, directional arrow symbols are selectively employed in the display space of the menu screens for providing a visual indication to a user of available previous and/or next menu screens. These arrow symbols occupy minimal space in the display screens, yet enable the user of the telephone terminal to easily determine the availability of and direction to proceed to access additional available menu selections in the interactive display.

BRIEF DESCRIPTION OF THE DRAWING

This invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
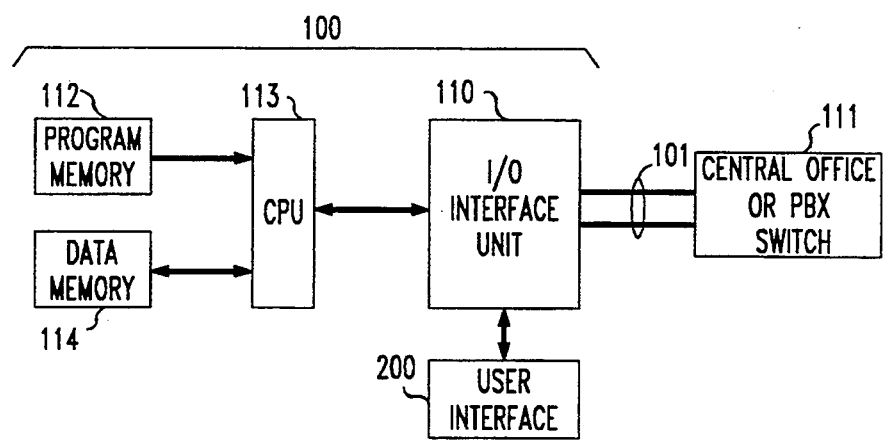
FIG. 1 is a block diagram of a telephone terminal useful in describing the present invention.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS ® central office (CO) switch or the DEFINITY ® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only- memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

While the embodiment of the present invention is described as being incorporated into a telephone terminal, it should be recognized that the present command-operated terminal could be utilized in other program-controlled systems. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification describes the operation of the present invention using the telephone terminal 100 shown in both FIGS. 1 and 2 together with the interactive displays 210-2, 210-3, 210-4, 210-5 and 210-6 respectively shown in FIGS. 2, 3, 4, 5 and 6 which, taken together, describe the functionality in the telephone terminal 100 required to implement the present invention.

Figure 3:
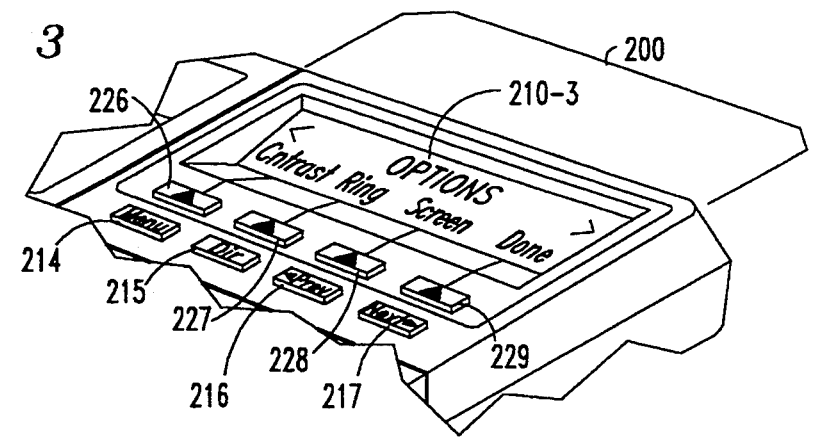
FIG. 3 illustrates a first alternative configuration for the display of information in the user interactive display shown in FIG. 2.
Figure 4:
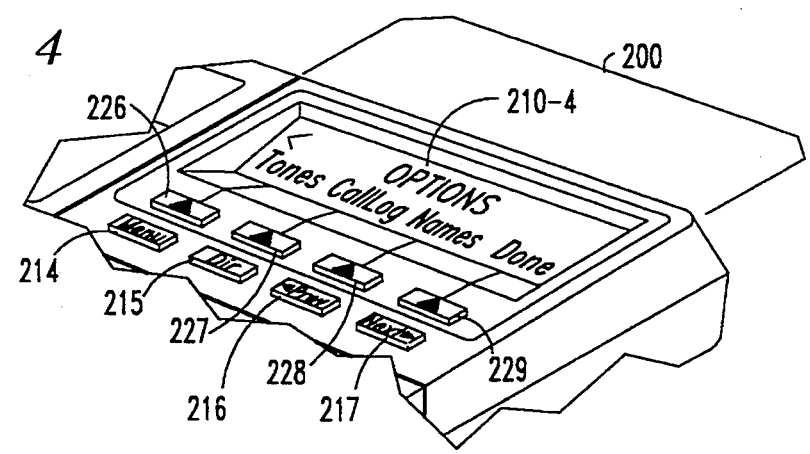
FIG. 4 illustrates a second alternative configuration for the display of information in the user interactive display shown in FIG. 2.
Figure 2:
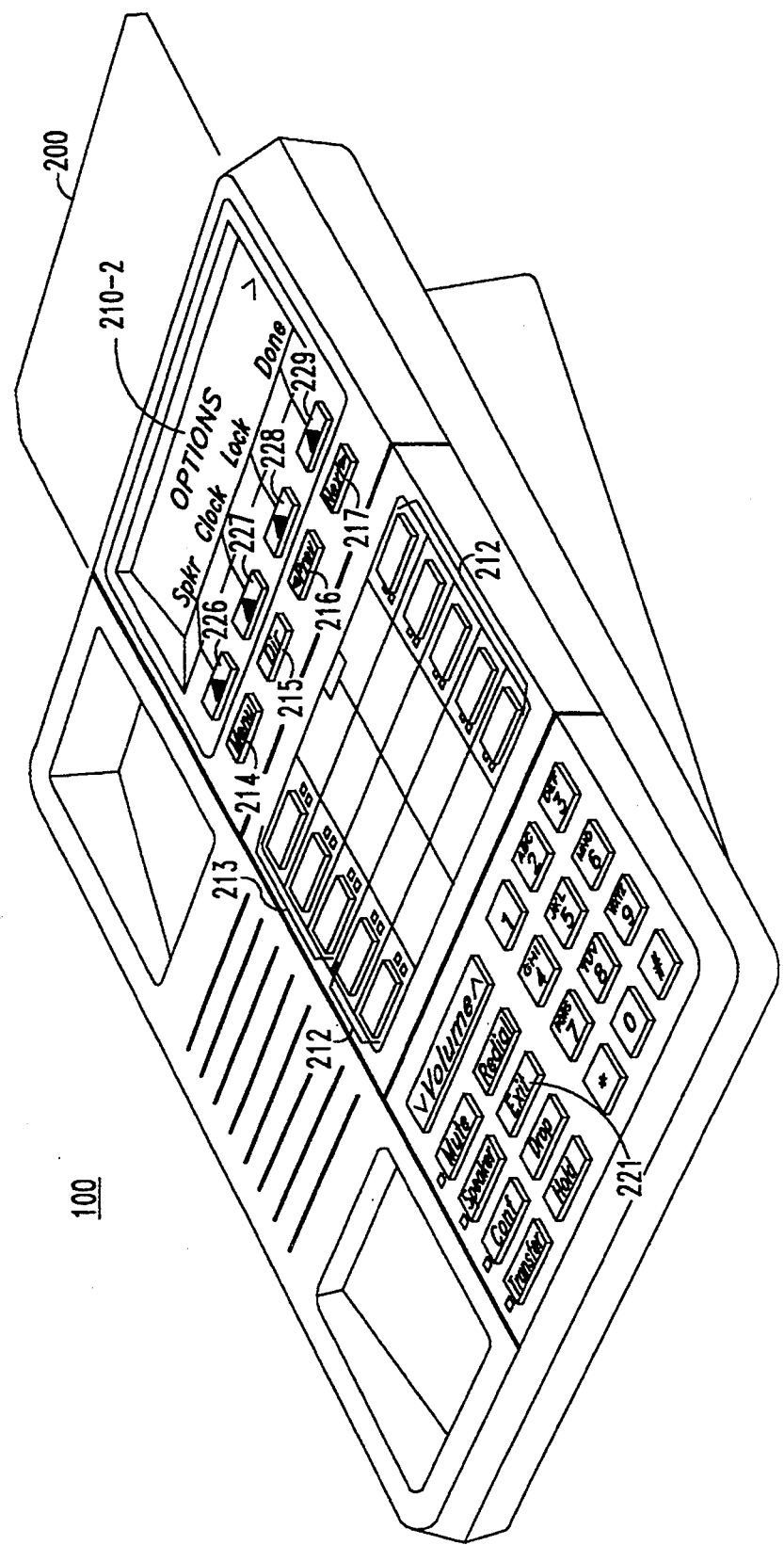
FIG. 2 illustrates the telephone terminal of FIG. 1 including a user interactive display, accessible in accordance with the present invention.
Figure 5:
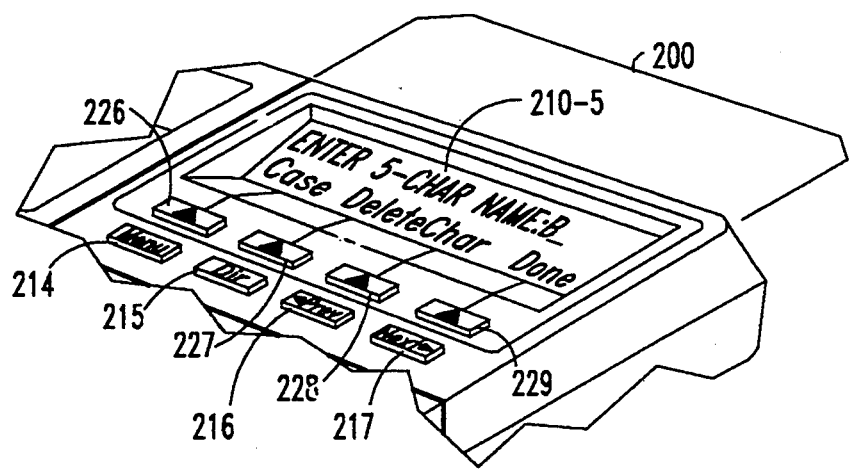
FIG. 5 illustrates a third alternative configuration for the display of information in the user interactive display shown in FIG. 2.

With reference to FIG. 2, FIG. 3 and FIG. 4 in combination and in accordance with the invention, the user interface 200 allows the user of the telephone terminal 100 to reconfigure the information shown in a user interactive display 210-2, shown in FIG. 2, to the information shown in display 210-3, shown in FIG. 3 or to the information shown in display 210-4 shown in FIG. 4, while accessing local features at the terminal. Similar screens providing network based features may be accessed at the terminal in the same manner.

The user interface 200 includes the user interactive display 210-2, as depicted in FIG. 2, and also interactive displays 210-3 and 210-4 as depicted in FIGS. 3 and 4 respectively. The user interface 200 also includes switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

The multiple hard buttons 214 through 217 are respectively labeled "Menu", "Dir", "<Prev", and "Next>". The Menu button 214 is used to configure the terminal to the local softkey state. Similarly, the Dir button 215 also configures the terminal to the local softkey state, and also gives the user quick access to a local directory stored in the terminal with the first few entries appearing on the display.

In accordance with the invention, the <Prev and Next> buttons 216 and 217 are used to access items provided in additional menu screens in both the local softkey state and in a network-based or switch feature state. In the local softkey state, for example, directory entries may be accessed by these buttons. In addition, these buttons may be used in the entering or editing process of a directory entry consisting of a name and telephone number. Also the <Prev and Next> buttons 216 and 217 may be used in the switch feature state, for example, to display the previous or next entry in a directory query feature.

In an illustration of the functionality of the <Prev and Next> buttons 226 and 227 and their interrelationship with the displays 210-2, through 210-6, in accordance with the invention, the following description is provided.

If on a small display, <Prev and Next> labels were placed on the display as softkeys, three pages of options would become five pages, forcing the user to scroll through more screens to find the feature that he or she wanted. On each of these five pages there would be two softkey features, a Prev softkey, and a Next softkey, or there would be two softkey features, a Next softkey, and a Done softkey.

A less-than symbol (<) and a greater-than symbol (>) are selectively employed in displays 210-2, 210-3 and 210-4 as directional arrows for facilitating the movement between menu screens by a user of the telephone terminal. These symbols provide the desired information for a user without significantly diminishing the available display space on a small display screen. In the illustrative example, display 210-2 is the first one of multiple screens at a particular level in the menu hierarchy of the interactive display. For this display, only the greater-than symbol (>) is provided in the displayed screen for providing an indication to the user of the terminal that at least one other menu screen exist at this level, but in order to get to this other menu screen, it is necessary to advance to this screen. This the user accomplishes at the terminal by pressing the Next> button 217.

Display 210-3 is illustrated as the second one of multiple screens at the same level as display 210-2 in the menu hierarchy of the interactive display. In this display 210-3, both the less-than symbol (<) and the greater-than symbol (>) are displayed as directional arrows for indicating to the user at the terminal that other menu screens exist at this level, both before and after this displayed screen. And in order to get to these menu screens, the user must press the <Prev button 216 to back up to the one or more screens preceding this displayed screen and the Next> button 217 to advance to the one or more screens following this displayed screen. It should become apparent to those skilled in the art that a display such as display 210-3 may be one of many display screens at the same level in the menu hierarch having both the less-than symbol (<) and the greater-than symbol (>) displayed therein.

Display 210-4 is illustratively shown as the last one of multiple screens at the same level as the display 210-2 in the menu hierarchy of the interactive display. For this display, only the less-than symbol (<) is provided in the displayed screen for providing an indication to the user of the terminal that at least one other menu screen exist at this level, but in order to get to this other menu screen, it is necessary to back up to this screen. This the user accomplishes at the terminal by pressing the <Prev button 216.

The labels and functions of the softkeys 226 through 229 appear on the associated displays 210-2, 210-3 and 210-4. The label or function for each of these keys changes dynamically as the user performs functions and makes selections via these softkeys. Shown in the display 210-2 is just one screen of menu OPTIONS available as local features at a designated level in the menu hierarchy of the display. The illustrated menu OPTION screen is that which shows how access for a user is provided to a speaker, a clock and a lock feature available in the telephone terminal 100.

Pressing either one of the three softkeys 226, 227 or 228 moves the display down a level in the menu hierarchy to the selected feature for setting or adjusting this feature as appropriate. Pressing the softkey 226 selects a menu screen which permits the speakerphone in the telephone terminal to be calibrated. Pressing the softkey 227 selects menu screens which permit the clock in the telephone terminal to be set. Pressing the softkey 228 selects menu screens which permit certain items such as the softkeys, a directory or a call log to be locked or unlocked and/or a password removed or changed. The softkey 229, associated with the Done label, is pressed when a user has completed the entries or has no entries for the displayed screen. Pressing the softkey 229 moves the display up a level in the menu hierarchy.

FIG. 3 shows a menu OPTIONS screen which displays the softkey labels Cntrast, Ring, Screen and Done. At this screen, the softkey 226 is used for setting the contrast of the display. The softkey 227 is used for setting the personalized ting pattern, and the softkey 228 is used for setting the timing of the information messages, i.e. fast, medium or slow.

FIG. 4 shows a menu OPTIONS screen which displays the softkey labels Tones, CallLog, Names and Done. At this screen, the softkey 226 is used for turning on or off the information tones associated with the information screen. The softkey 227 enables the user the to set up the calllog at the telephone terminal so that all calls are logged, incoming unanswered calls only are logged or no calls are logged. Pressing the softkey 228 enables the user to set the number of names that appear on a directory page. The number of names selected may be either 1) three names plus Quit appearing on the page or 2) four names appearing on the page. After any desired editing is completed, the terminal is informed of such completion by the user depressing the softkey 229.

Mapping of additional functions onto <Prev and Next> with similar directional components frees up the screen for additional softkey features or functions. For example, the use of <Prev and Next> as a physical button can be seen in FIG. 5. When the user is entering an entry name, such as Bobby, the user must use Next>. To enter the first "B" and the "o", the user must only press the dial pad key which corresponds to the "o". In contrast, when the second "b" has been entered with the use of the 2 key on the dial pad, Next> moves the cursor to the next space. The user may now enter the third "b" with that same 2 key on the dial pad.

Figure 6:
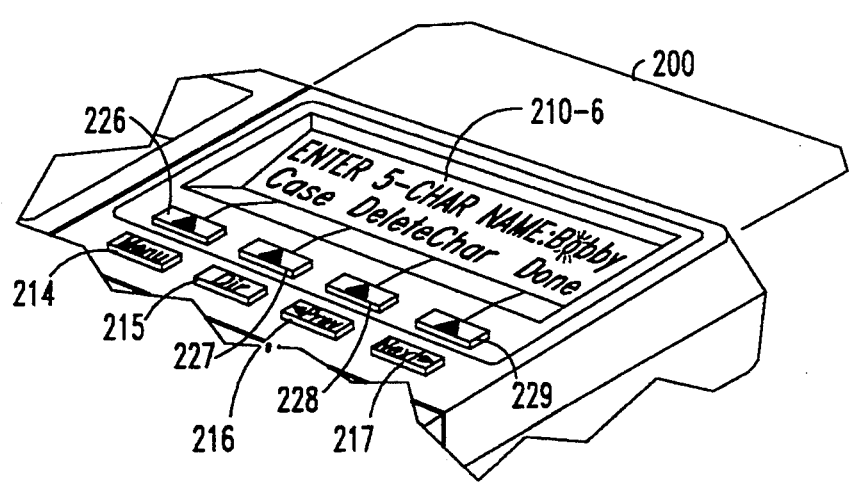
FIG. 6 illustrates a fourth alternative configuration for the display of information in the user interactive display shown in FIG. 2.

If the user decides to change the word Bobby to something else, the user could use <Prey to move the cursor to the "o", as shown in FIG. 6. At this point, the user is now able to use DeleteChar to erase the "o" and insert a letter in its place by using a key on the dial pad. The Next> button now can be used to move the cursor from the new character to the space after the "y".

With this arrangement of <Prev and Next> as physical buttons, other features such as Case, Backspace, DeleteChar, and Done, are available when entering a name. Case is used to change an uppercase letter to lowercase and a lowercase letter to uppercase. Backspace moves the cursor back one space and erases the previous letter. DeleteChar erases a letter in the middle of a string and moves all the letters located to the right of the deleted letter one space to the left. Done is used to accept the name entered regardless of the position of the cursor.

Wherever bi-directional movement existed in the interface, it is mapped to the <Prev and Next> buttons. This permits additional features and functions to be presented to the user via softkeys as described herein above.

What has been described is merely illustrative of the present invention. Other applications to telephone, computer or other user interactive systems other than the disclosed system are contemplated as being within the knowledge of one skilled in the an and may be utilized without departing from the spirit and scope of the present invention.

We claim:

1. An arrangement for displaying menu screens of information messages in a display device at a telephone terminal connectable to a telecommunication switch, the arrangement comprising:

means for generating a plurality of sets of information messages in the telephone terminal, each one of the sets of information messages being displayed in an associated menu screen;

directional arrow symbols in each displayed menu screen for providing an indication of additional available menu screens at a level only when said menu screens are available at said level, said directional arrow symbols selectively providing a direction for proceeding in the display device for accessing said additional available menu screens at said level; means external to each displayed menu screen for accessing each of the additional available menu screens, the accessing means providing first and second button means for respectively providing previous and next functionality for accessing the additional available menu screens, the first button means being associated with a first one of the directional arrow symbols for providing a means for moving back to an available first one of the menu screens from the displayed menu screen and the second button means being associated with a second one of the directional arrow symbols for providing a means for advancing forward to an available second one of the menu screens; and means for only displaying the first directional arrow symbol in the displayed menu screen when only a first one of the menu screens is available for display.

2. The arrangement of claim 1 wherein the first and second button means comprise a pair of hard key buttons located on the telephone terminal.

3. The arrangement of claim 1 where the first directional arrow symbol comprises a less-than (<) symbol.

4. The arrangement of claim 1 further comprising means for only displaying the second directional arrow symbol in the displayed menu screen when only a second one of the menu screens is available for display.

5. The arrangement of claim 1 where the second directional arrow symbol comprises a greater-than (>) symbol.

6. A method of displaying screens of information messages in a display device at a telephone terminal connectable to a telecommunication switch, the method comprising the steps of:

generating a plurality of sets of information messages in the telephone terminal, each one of the sets of information messages being displayed in an associated menu screen;

providing directional arrow symbols as an indication of additional available menu screens in each displayed menu screen at a level only when said menu screens are available at said level, said direction arrow symbols providing step also selectively providing a direction for proceeding in the display device for accessing any additional available menu screens at said level;

providing access to each of the additional available menu screens, the access providing step being located external to the menu screen, the accessing step providing first and second buttons for respectively providing previous and next functionality for accessing the additional available menu screens, the first button being associated with a first one of the directional arrow symbols for providing a means for moving back to an available first one of the menu screens from the displayed menu screen and the second button being associated with a second one of the directional arrow symbols for providing a means for advancing forward to an available second one of the menu screens; and displaying only the first directional arrow symbol in the displayed menu screen when only a first one of the menu screens is available for display.

7. The method of claim 6 wherein the first and second buttons includes a pair of hard key buttons located on the telephone terminal.

8. The method of claim 6 where the first directional arrow symbol comprises a less-than (<) symbol.

9. The method of claim 6 further comprising the step of displaying only the second directional arrow symbol in the displayed menu screen when only a second one of the menu screens is available for display.

10. The method of claim 6 where the second directional arrow symbol comprises a greater-than (>) symbol.

11. An arrangement for displaying menu screens of information messages in a display device at a telephone terminal connectable to a telecommunication switch, the arrangement comprising:

means for generating a plurality of sets of information messages in the telephone terminal, each one of the sets of information messages being displayed in an associated menu screen;

directional arrow symbols in each displayed menu screen for providing an indication of additional available menu screens at a level only when said menu screens are available at said level, said directional arrow symbols selectively providing a direction for proceeding in the display device for accessing said additional available menu screens at said level;

a pair of hard key buttons located on the telephone external to each displayed menu screen for accessing each of the additional available menu screens, the pair of hard key buttons respectively providing previous and next functionality for accessing the additional available menu screens, a first one of the pair of hard key buttons being associated with a first one of the directional arrow symbols for providing means for moving back to an available first one of the menu screens from the displayed menu screen and a second one of the pair of hard key buttons being associated with a second one of the directional arrow symbols for providing means for advancing forward to an available second one of the menu screens; and means for only displaying the first directional arrow symbol in the displayed menu screen when only a first one of the menu screens is available for display.

12. An arrangement for displaying menu screens of information messages in a display device at a telephone terminal connectable to a telecommunication switch, the arrangement comprising:

means for generating a plurality of sets of information messages in the telephone terminal, each one of the sets of information messages being displayed in an associated menu screen;

directional arrow symbols in each displayed menu screen for providing an indication of additional available menu screens at a level only when said menu screens are available at said level, said directional arrow symbols selectively providing a direction for proceeding in the display device for accessing said additional available menu screens at said level;

a pair of hard key buttons located on the telephone external to each displayed menu screen for accessing each of the additional available menu screens, the pair of hard key buttons respectively providing previous and next functionality for accessing the additional available menu screens, a first one of the pair of hard key buttons being associated with a first one of the directional arrow symbols for providing means for moving back to an available first one of the menu screens from the displayed menu screen and a second one of the pair of hard key buttons being associated with a second one of the directional arrow symbols for providing means for advancing forward to an available second one of the menu screens; and means for only displaying the second directional arrow symbol in the displayed menu screen when only a second one of the menu screens is available for display.

13. A method of displaying screens of information messages in a display device at a telephone terminal connectable to a telecommunication switch, the method comprising the steps of:

generating a plurality of sets of information messages in the telephone terminal, each one of the sets of information messages being displayed in an associated menu screen;

providing directional arrow symbols in each displayed menu screen at a level only when additional available menu screens are at said level, said directional arrow symbols selectively providing a direction for proceeding in the display device for accessing said additional available menu screens at said level;

providing a pair of hard key buttons on the telephone external to each displayed menu screen for accessing each of the additional available menu screens, the pair of hard key buttons respectively providing previous and next functionality for accessing the additional available menu screens, a first one of the pair of hard key buttons being associated with a first one of the directional arrow symbols for providing means for moving back to an available first one of the menu screens from the displayed menu screen and a second one of the pair of hard key buttons being associated with a second one of the directional arrow symbols for providing means for advancing forward to an available second one of the menu screens; and displaying only the first directional arrow symbol in the displayed menu screen when only a first one of the menu screens is available for display.

14. A method of displaying screens of information messages in a display device at a telephone terminal connectable to a telecommunication switch, the method comprising the steps of:

generating a plurality of sets of information messages in the telephone terminal, each one of the sets of information messages being displayed in an associated menu screen;

providing directional arrow symbols in each displayed menu screen at a level only when additional available menu screens are at said level, said directional arrow symbols selectively providing a direction for proceeding in the display device for accessing said additional available menu screens at said level;

providing a pair of hard key buttons on the telephone external to each displayed menu screen for accessing each of the additional available menu screens, the pair of hard key buttons respectively providing previous and next functionality for accessing the additional available menu screens, a first one of the pair of hard key buttons being associated with a first one of the directional arrow symbols for providing means for moving back to an available first one of the menu screens from the displayed menu screen and a second one of the pair of hard key buttons being associated with a second one of the directional arrow symbols for providing means for advancing forward to an available second one of the menu screens; and displaying only the second directional arrow symbol in the displayed menu screen when only a second one of the menu screens is available for display.

* * * * *